(12) United States Patent
Ohlsson et al.

(10) Patent No.: US 10,231,260 B2
(45) Date of Patent: Mar. 12, 2019

(54) SELECTIVE DISTRIBUTION OF SYSTEM INFORMATION FOR MTC (71) Applicant: TELEFONAKTIEBOLAGET LM ERICSSON (PUBL), Stockholm (SE)

(72) Inventors: Oscar Ohlsson, Stockholm (SE); Andreas Höglund, Solna (SE); Emre Yavuz, Stockholm (SE); Anders Wallén, Ystad (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 15/041,315

(22) Filed: Feb. 11, 2016

(65) Prior Publication Data
US 2016/0242206 A1    Aug. 18, 2016

Related U.S. Application Data (60) Provisional application No. 62/115,210, filed on Feb. 12, 2015.

(51) Int. Cl.
H04W 72/12    (2009.01)
H04W 74/00    (2009.01)

(52) U.S. Cl.
CPC ... H04W 72/1289 (2013.01); H04W 72/1231 (2013.01); H04W 74/006 (2013.01)

(58) Field of Classification Search
CPC ............. H04W 72/085; H04W 52/242; H04W 52/245; H04W 52/283; H04L 1/08;
(Continued)

(56) References Cited

U.S. PATENT DOCUMENTS

2015/0016312 A1*  1/2015  Li .................... H04W 74/0833
                                                    370/280
2017/0105166 A1*  4/2017  Lee ........................ H04W 48/12

FOREIGN PATENT DOCUMENTS

EP    2262339 A1    12/2010

OTHER PUBLICATIONS

Ericsson: "System information acquisition for low complexity and coverage enhanced UEs", 3GPP Draft; R2-150454—System Information Acquisition for Low Complexity and Coverage Enhanced UEs, 3rd Generation Partnership Project (3GPP), Mobile Competence Centre ; 650, Route Des Lucioles ; F-0 vol. RAN WG2, No. Athens, Greece; Feb. 9, 2015-Feb. 13, 2015. Jan. 30, 2015 (Jan. 30, 2015).

(Continued)

Primary Examiner — Marsha D Banks Harold
Assistant Examiner — Elton Williams (57) ABSTRACT According to some embodiments, a method in a wireless device of a wireless communication network comprises receiving scheduling information for one or more System Information (SI) messages. The wireless device determines a coverage enhancement level associated with each of the one or more SI messages based on the received scheduling information. The wireless device also determines a coverage enhancement level of the wireless device. After identifying a subset of the one or more SI messages based on the determined coverage enhancement level of the wireless device, the wireless device acquires a SI message from the identified subset of the one or more SI messages.

24 Claims, 5 Drawing Sheets (58) Field of Classification Search
CPC ..... H04L 1/189; H04L 1/1819; H04L 1/1845; H04L 1/1816; H04B 17/309; H04B 17/318; Y02B 60/50
See application file for complete search history.

(56) References Cited

OTHER PUBLICATIONS

LG Electronics Inc: "Impacts of extended coverage on system information" 3GPP Draft; R2-140780 Impacts of Extended Coverage on System Information, 3rd Generation Partnership Project (3GPP), Mobile Competence Centre .• 650, Route Des Lucioles .• F-06921 Sophia-Antipolis Cedex vol. RAN WG2, No. Prague, Czech Republic; Feb. 10, 2014-Feb. 14, 2014 Feb. 9, 2014 (Feb. 9, 2014).
Ericsson. Revised WI: Further LTE Physical Layer Enhancements for MTC. 3GPP TSG RAN Meeting #66. RP-141865. Edinburgh, Scotland, Sep. 9-12, 2014.

\* cited by examiner

SELECTIVE DISTRIBUTION OF SYSTEM INFORMATION FOR MTC

TECHNICAL FIELD

Particular embodiments relate generally to wireless communications and more particularly to selective distribution of system information for machine type communications (MTC) user equipment (UE).

BACKGROUND

Machine-Type Communication (MTC) is a form of data communication involving one or more entities that do not necessarily need human interaction. MTC is an important and growing revenue stream for wireless network operators. MTC devices, such as monitors, sensors, controls, etc., may also be referred to as MTC user equipment (UE). Operators benefit from serving MTC devices with already deployed radio access technology. For example, long term evolution (LTE) is a competitive radio access technology for efficient support of MTC.

The Third Generation Partnership Project (3GPP) LTE specification defines battery life, device cost/complexity, and coverage optimizations for MTC. MTC devices are sometimes located in challenging locations, for which LTE network rollouts were not dimensioned for full coverage. For example, smart meters are often placed in building basements and are sometime contained in metal enclosures. Similarly, in smart agriculture use cases, MTC devices may be located in rural and isolated areas.

3GPP achieves MTC device cost/complexity reduction through various techniques. One technique includes reducing the UE transmit and receive bandwidth from 20 MHz to 1.4 MHz. The reduced bandwidth means that the UE will transmit or receive up to 6 physical resource blocks (PRBs) at 180 kHz instead of up to 100 PRBs.

To achieve adequate coverage for low-complexity UEs and other UEs operating delay tolerant MTC applications, time repetition and retransmission techniques may be used to facilitate energy accumulation of the received signals in both the downlink and uplink. The amount of repetition of the physical signals and channels transmitted to and from a UE may be optimized with respect to the UE's coverage situation (e.g., more repetitions in bad coverage situations than in good coverage situations).

One particular type of information that benefits from reliable transmission is system information. To acquire access to a cell and generally operate within the cell and network, a wireless device acquires system information that is repeatedly broadcasted by the network. The main part of the system information is included in various System Information Blocks (SIBs). Each SIB contains a common type of information (e.g., access parameters in SIB1 and radio resource configuration in SIB2). LTE currently defines seventeen different SIBs.

The various SIBs are mapped to different System Information (SI) messages, which correspond to the transport blocks transmitted over the air interface. An exception is SIB1, which is transmitted without a mapping to an SI message. SIB1 is also special in that it is transmitted using a fixed schedule (periodicity of 80 ms, with repetition in subframe #5 every 20 ms). It contains the SIB-to-SI mapping and scheduling information for the SI messages.

For SIB1 and the SI messages to be decodable by all UEs in a cell, including UEs at the cell edge and UEs with poor radio conditions, the network may use a technique referred to as soft combining. The soft combining technique repeats the transport block containing SIB1 or an SI message over multiple sub frames. The receiver combines the received transmission with previous transmissions and attempts to decode the message. After a sufficient number of repetitions, the accumulated signal energy may be high enough that the decoding succeeds.

Another SIB1, referred to as CE-SIB1, may specifically account for low complexity UEs operating in enhanced coverage. Similarly to legacy SIB1, CE-SIB1 may contain SIB-to-SI mapping and scheduling information for the SI messages. A difference is that CE-SIB1 may be sent within a reduced bandwidth and using more repetitions than legacy SIB1 so that low complexity UEs in enhanced coverage are capable of receiving it. The contents of CE-SIB1 may be the same as the contents of the legacy SIB1 or a subset of the contents of legacy SIB1. CE-SIB1 may also include (a subset of) information from other legacy SIBs (e.g. SIB2, SIB14, SIB3, etc.).

The transport block containing the SI message may or may not be associated with further resource allocation information transmitted in a downlink control information (DCI) over a physical downlink control channel (e.g. EPDCCH). For example, the resource allocation information may be transmitted either in its entirety in CE-SIB1 or partly in CE-SIB1 and partly in a DCI. If the SIB-to-SI mapping information is small enough, it may be transmitted in unused (spare) bits in the master information block (MIB) on the physical broadcast channel (PBCH).

Enhanced coverage may also be supported for so-called normal-complexity UEs (i.e., UEs without the 6 PRB bandwidth restriction or other types of complexity reductions). In one example, the normal-complexity UE may mimic some of the behaviors of a low complexity UE when operating in enhanced coverage. In particular, this means that a normal-complexity UE may read CE-SIB1 and the associated SI messages. The examples and embodiments described herein do not distinguish between a low complexity UE and a normal-complexity UE operating in enhanced coverage, and are applicable to both.

A problem with re-using existing SI message scheduling used with SIB1 with CE-SIB1 is that the existing SI message scheduling does not facilitate differentiation between low complexity UEs in normal coverage and those in enhanced coverage. For example, low complexity UEs in enhanced coverage may attempt to acquire all SI messages listed in CE-SIB1, even those containing non-essential SIBs (i.e., SIBs that are not strictly necessary for low complexity UEs in enhanced coverage). Because a low complexity UE in enhanced coverage may need to accumulate a very large number of repetitions to successfully decode an SI message, this could potentially lead to a large waste of time and power. The lack of differentiation also implies that all SI messages are sent with the same (i.e., maximum) repetition level, which may be spectrally inefficient and result in increased system overhead.

SUMMARY

According to some embodiments, a method in a wireless device of a wireless communication network comprises receiving scheduling information for one or more System Information (SI) messages. The wireless device determines a coverage enhancement level associated with each of the one or more SI messages based on the received scheduling information. The wireless device also determines a coverage enhancement level of the wireless device. After identifying a subset of the one or more SI messages based on the determined coverage enhancement level of the wireless device, the wireless device acquires a SI message from the identified subset of the one or more SI messages.

In particular embodiments, determining a coverage enhancement level associated with each of the one or more SI messages comprises determining the coverage enhancement level using an explicit indication included in the scheduling information. In other embodiments, it comprises determining that a resource allocation included in the scheduling information is sufficient to acquire an SI message based on the coverage enhancement level of the wireless device. The resource allocation included in the scheduling information may comprise a number of transmission repetitions associated with the respective SI message. In other embodiments, determining a coverage enhancement level associated with each of the one or more SI messages comprises determining the coverage level of at least one of a physical downlink control channel and a transmission block.

In particular embodiments, the method further comprises the wireless device determining that acquiring a SI message from the identified subset of the one or more SI messages is unsuccessful. The wireless device then determines an increased coverage enhancement level of the wireless device and identifies a new subset of the one or more SI messages based on the determined increased coverage enhancement level of the wireless device. The wireless device then acquires a SI message from the identified new subset of the one or more SI messages.

In particular embodiments, determining a coverage enhancement level of the wireless device comprises measuring an amount of accumulated information the wireless device needs to detect a synchronization or broadcast signal. In other embodiments, determining a coverage enhancement level of the wireless device comprises alternatively or additionally obtaining a metric of the signal strength and/or quality of a reference signal.

According to some embodiments, a method in a network node of a wireless communication network comprises associating a coverage enhancement level with each of one or more System Information (SI) messages, wherein the coverage enhancement level corresponds to a transmission parameter indicative of an intended amount of coverage enhancement of the associated SI message; and transmitting scheduling information that includes the associated coverage enhancement level for each of the one or more SI messages to a plurality of wireless devices. In particular embodiments, the coverage enhancement level associated with each of the one or more SI messages comprises an explicit indication included in the scheduling information. In other embodiments, the coverage enhancement level associated with each of the one or more SI messages comprises a resource allocation included in the scheduling information, the resource allocation providing sufficient resources to acquire a SI message based on a coverage enhancement level of a wireless device. The resource allocation included in the scheduling information may comprise a number of transmission repetitions associated with a respective SI message.

In particular embodiments, the coverage enhancement level associated with each of the one or more SI messages comprises a coverage enhancement level for at least one of a physical downlink control channel and a transmission block.

According to some embodiments, a wireless device comprises a processor operable to receive scheduling information for one or more System Information (SI) messages. The processor is further operable to determine a coverage enhancement level associated with each of the one or more SI messages based on the received scheduling information; determine a coverage enhancement level of the wireless device; and identify a subset of the one or more SI messages based on the determined coverage enhancement level of the wireless device. The processor is also operable to acquire a SI message from the identified subset of the one or more SI messages.

According to some embodiments, a network node comprises a processor operable to associate a coverage enhancement level with each of one or more System Information (SI) messages, wherein the coverage enhancement level corresponds to a transmission parameter indicative of an intended amount of coverage enhancement of the associated SI message. The processor is also operable to transmit scheduling information that includes the associated coverage enhancement level for each of the one or more SI messages to a plurality of wireless devices.

According to some embodiments, a wireless device comprises a receiving module, a determining module, and an acquiring module. The receiving module is operable to receive scheduling information for one or more System Information (SI) messages. The determining module is operable to determine a coverage enhancement level associated with each of the one or more SI messages based on the received scheduling information; determine a coverage enhancement level of the wireless device; and identify a subset of the one or more SI messages based on the determined coverage enhancement level of the wireless device. The acquiring module is operable to acquire a SI message from the identified subset of the one or more SI messages.

According to some embodiments, a network node comprises an associating module and a communications module. The associating module is operable to associate a coverage enhancement level with each of one or more System Information (SI) messages, wherein the coverage enhancement level corresponds to a transmission parameter indicative of an intended amount of coverage enhancement of the associated SI message. The communications module is operable to transmit scheduling information that includes the associated coverage enhancement level for each of the one or more SI messages to a plurality of wireless devices.

Also disclosed is a computer program product. The computer program product comprises instructions stored on non-transient computer-readable media which, when executed by a processor, perform the acts of receiving scheduling information for one or more System Information (SI) messages; determining a coverage enhancement level associated with each of the one or more SI messages based on the received scheduling information; determining a coverage enhancement level of the wireless device; identifying a subset of the one or more SI messages based on the determined coverage enhancement level of the wireless device; and acquiring a SI message from the identified subset of the one or more SI messages.

Another computer program product comprises instructions stored on non-transient computer-readable media which, when executed by a processor, perform the acts of associating a coverage enhancement level with each of one or more System Information (SI) messages, wherein the coverage enhancement level corresponds to a transmission parameter indicative of an intended amount of coverage enhancement of the associated SI message; and transmitting scheduling information that includes the associated coverage enhancement level for each of the one or more SI messages to a plurality of wireless devices.

Particular embodiments may exhibit some of the following technical advantages. In particular embodiments, the scheduling information in CE-SIB1 indicates a coverage enhancement level associated with each SI message. Based on the associated coverage enhancement level, a low complexity UE may determine whether it should, or is able, to acquire a specific SI message. In some embodiments, different sets of system information may be distributed to low complexity UEs with differing levels of coverage enhancement (e.g., in different coverage situations). For example, low complexity UEs requiring high amounts of coverage enhancement may avoid reading non-essential system information or system information that cannot be decoded (due to the number of repetitions being too few), thereby conserving both time and power. In addition, system resources may be preserved because SI messages intended for low complexity UEs in normal coverage may be sent with fewer repetitions.

Some embodiments may benefit from some, none, or all of these advantages. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Using existing SI message scheduling with CE-SIB1 does not facilitate differentiation between low complexity UEs in normal coverage and those in enhanced coverage, which can lead to a waste of time and power. For example, low complexity UEs in enhanced coverage may attempt to acquire all SI messages listed in CE-SIB1, even those containing non-essential SIBs. Thus, a low complexity UE in enhanced coverage may need to accumulate a very large number of repetitions to successfully decode an SI message, which is an inefficient use of time and power. Furthermore, the lack of differentiation also implies that all SI messages are sent with the same repetition level, which may be spectrally inefficient and result in increased system overhead.

An object of the present disclosure is to obviate at least these disadvantages and provide scheduling information in CE-SIB1 that indicates a coverage enhancement level associated with each SI message. Based on the associated coverage enhancement level, a low complexity UE may determine whether it should, or is able, to acquire a specific SI message. For example, low complexity UEs requiring high amounts of coverage enhancement may avoid reading non-essential system information or system information that cannot be decoded, thereby conserving both time and power. In addition, system resources may be preserved because SI messages intended for low complexity UEs in normal coverage may be sent with fewer repetitions.

Particular embodiments are described with reference to FIGS. 1-5B of the drawings, like numerals being used for like and corresponding parts of the various drawings. LTE (including an evolved packet core (EPC)) is used throughout this disclosure as an example cellular system, but the ideas presented herein apply to other wireless communication systems (e.g., WCDMA/UMTS, etc.) as well.

Figure 1:
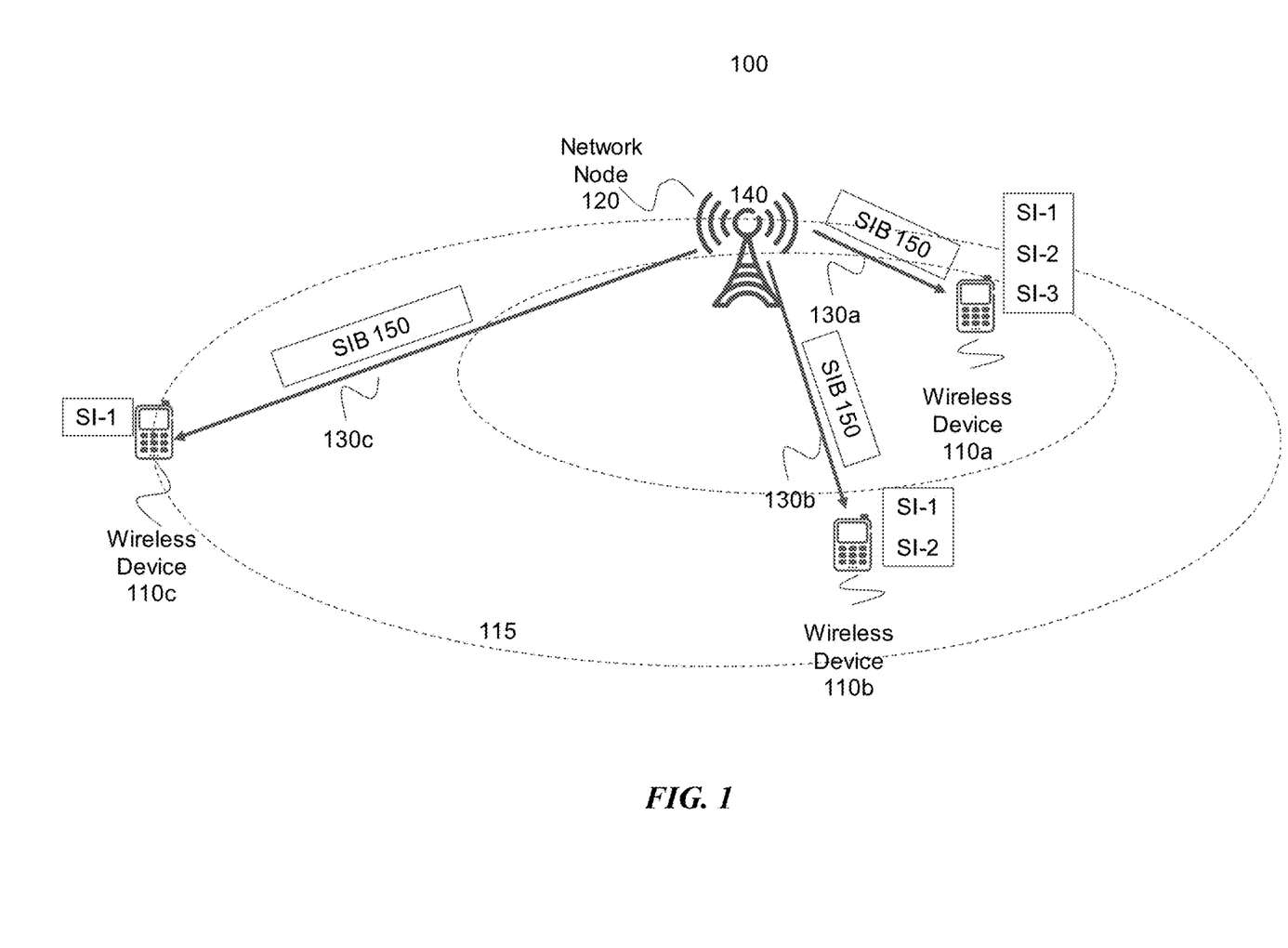
FIG. 1 is a block diagram illustrating an example of a wireless radio network, according to a particular embodiment.

FIG. 1 is a block diagram illustrating an example of a wireless radio network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes. The network nodes include network nodes 120, such as base stations or eNodeBs. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

Wireless signals 130 may include both downlink transmissions (from network node 120 to wireless devices 110) and uplink transmissions (from wireless devices 110 to network node 120). Wireless signals 130 may include discovery signals. Discovery signals may include, for example, reference signals used for performing Radio Resource Management (RRM) measurements. Discovery signals may also include, for example, synchronization signals such Primary Synchronization Signals (PSS) and Secondary Synchronization Signals (SSS). Wireless device 110 may detect the synchronization signals to determine system information for wireless network 100. Any of these signals or any group of these signals may be referred to as discovery reference signals (DRS). Wireless signals 130 may include broadcast information such as system information (transmitted in system information blocks (SIBs), such as SIB 150).

Various SIBs 150 include the main part of the system information. Each SIB 150 may contain a common type of information (e.g., access parameters in SIB1 and radio resource configuration in SIB2). LTE currently defines seventeen different SIBs (i.e., SIB1, SIB2, . . . , SIB17). SIB 150 may refer to any of these seventeen SIBs, any additional SIBs such as CE-SIBS, or any newly defined SIB. The various SIBs 150 are mapped to different SI messages, which correspond to the transport blocks transmitted over the air interface. An exception is SIB1, which is transmitted without a mapping to an SI message. SIB1 is also special in that it is transmitted using a fixed schedule (periodicity of 80 ms, with repetition in subframe #5 every 20 ms). SIB1 contains the SIB-to-SI mapping and scheduling information for the SI messages.

The radio properties of wireless signals 130 received by wireless devices 110 that are located at different positions within cell 115 may vary. For example, wireless device 110a close to network node 120 may receive strong wireless signals 130a. Wireless device 110b located farther away from network node 120 may receive degraded wireless signals 130b. Wireless device 110c located near the edge of cell 115 may receive even weaker wireless signals 130c. Factors other than location, such as topography, building structures, etc. may also impact the properties of wireless signals 130.

For SIB1 and the SI messages to be decodable by all wireless devices 110 in a cell, such as wireless device 110c at the cell edge or wireless device 110b with degraded radio conditions, wireless network 100 may use a technique referred to as soft combining. The soft combining technique repeats the transport block containing SIB1 or an SI message over multiple subframes. A receiver, such as wireless device 110, combines the received transmission with previous transmissions and attempts to decode the message. After a sufficient number of repetitions, the accumulated signal energy may be high enough that the decoding succeeds.

In particular embodiments, the SIB message scheduling information includes a coverage enhancement level associated with each of the SI messages. The coverage enhancement level corresponds to a transmission parameter indicative of an intended amount of coverage enhancement of the associated SI message. For example, transmission parameters may refer to a number of repetitions used for soft combining, or any other suitable transmission parameter. In some embodiments, the coverage enhancement level may be represented explicitly by enumerating particular levels (e.g., level 0, level 1, level 2, etc.). In other embodiments, the coverage enhancement level may be determined implicitly by evaluating transmission parameters associated with each SI message. For example, a SI message associated with a higher number of repetitions may be determined to be associated with a higher coverage enhancement level than a SI message associated with a lower number of repetitions.

Network node 120 transmits and receives wireless signals 130 using antenna 140. In particular embodiments, network node 120 may comprise multiple antennas 140. For example, network node 120 may comprise a multi-input multi-output (MIMO) system with two, four, or eight antennas 140.

In network 100, each network node 120 may use any suitable radio access technology, such as LTE, LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 4A below. Similarly, a network node may include any suitable combination of hardware and/or software. For example, in particular embodiments, a network node, such as network node 120, may include the components described with respect to FIG. 5A below.

Low complexity UEs, such as wireless devices 110, may be categorized by different coverage enhancement levels, depending on the required amount of coverage improvement (with respect to normal LTE coverage). For example, low complexity UEs that do not require any coverage improvement (i.e., low complexity UEs in "normal coverage") may be referred to as being at the zeroth level, according to some embodiments. Low complexity UEs at the same level may be referred to as belonging to the same coverage enhancement class.

As an example, with respect to FIG. 1, wireless device 110a may receive a strong wireless signal 130a from network node 120 and may be associated with coverage enhancement level 0. Wireless device 110b may receive a weaker wireless signal 130b and may be associated with coverage enhancement level 1. Similarly, wireless device 110c, which receives the weakest signal 130c, may require the most amount of coverage enhancement and may be associated with coverage enhancement level 3.

The embodiments described herein include steps performed by a wireless device, such as a UE, and a network node, such as an eNB. Modifications of the steps are possible without changing the disclosed embodiments. Some embodiments may have counterparts in both types of nodes. For example, an embodiment for transmitting information from a network node may have a corresponding embodiment for receiving the information in a wireless device, or vice versa.

Figure 2:
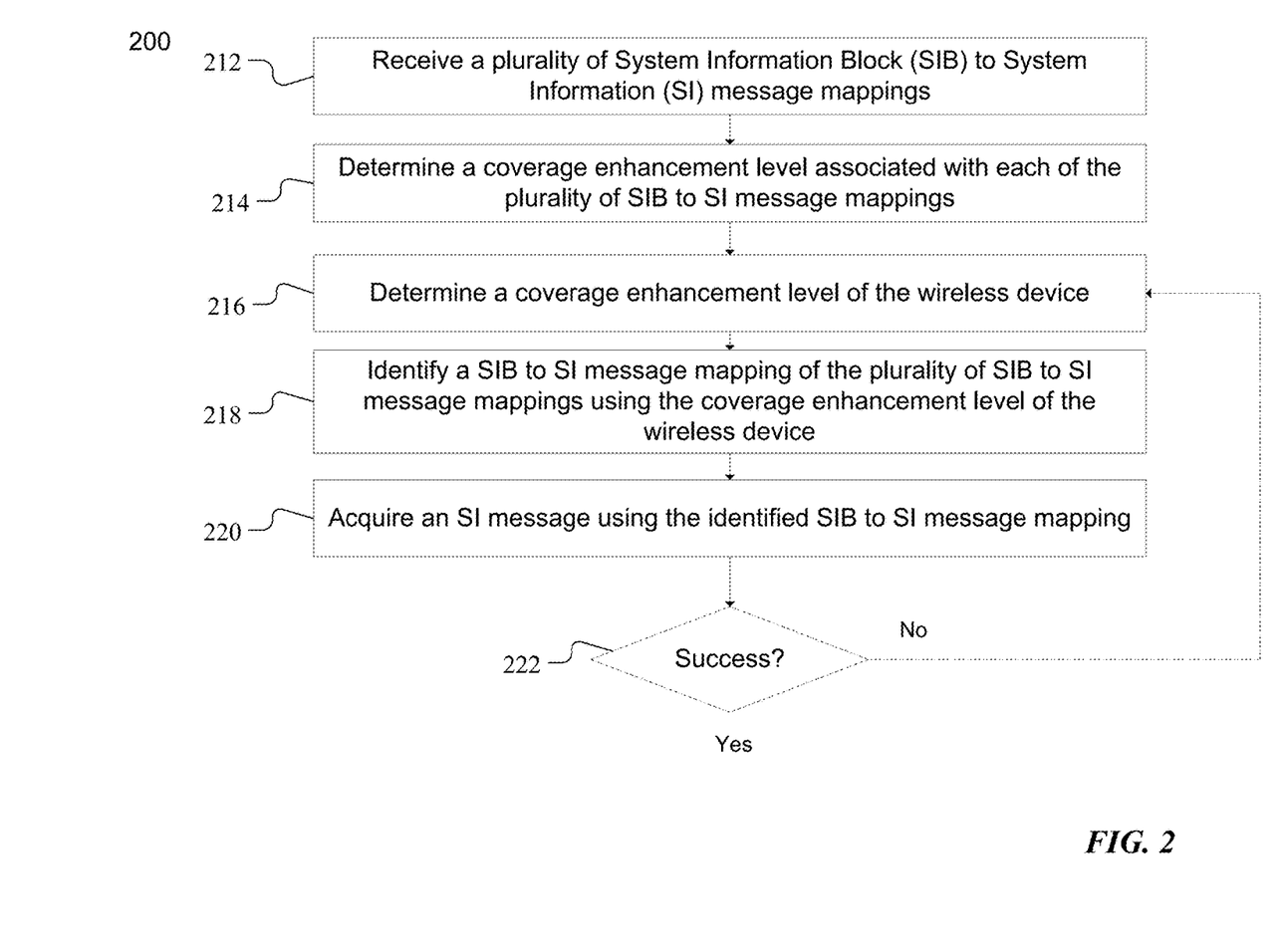
FIG. 2 is a flowchart of an example method in a wireless device of selectively distributing system information, according to a particular embodiment.

FIG. 2 is a flowchart of an example method 200 in a wireless device of selectively distributing system information, according to a particular embodiment. In particular embodiments, one or more steps of the method may be performed by components of network 100 described with reference to FIGS. 1-5B.

The method begins at step 212, where a wireless device receives a plurality of System Information Block to System Information Message mappings. In particular embodiments, an eNB may repeatedly broadcast CE-SIB1 if low complexity UEs or coverage enhancement is supported in the cell. For example, network node 120 may broadcast CE-SIB1 to wireless devices 110 in cell 115.

CE-SIB1 may contain a SIB-to-SI mapping and scheduling information for each SI message. The scheduling information may include a coverage level indication that indicates the SI message is intended for a particular coverage enhancement level or a particular range of coverage enhancement levels.

For example, the table below illustrates example scheduling information. The example includes three coverage enhancement levels (0, 1, 2) corresponding to 0, 5, and 10 dB of required coverage improvement, respectively. The first SI message (SI-1) contains SIB2 and is intended to be read by low complexity UEs at all coverage enhancement levels (CE level<=2). SI-2 contains SIB3 and is intended to be read by low complexity UEs at the first two coverage enhancement levels (CE level<=1). SI-3 contains both SIB16 and SIB17 and is intended to be read by low complexity UEs in normal coverage (CE level<=0). While three CE levels are used as an example in the embodiments described herein, other embodiments may use any suitable number of CE levels.

| SI Messages | Included SIBs | CE Level |
| --- | --- | --- |
| SI-1 | SIB2 | 2 |
| SI-2 | SIB3 | 1 |
| SI-3 | SIB16, SIB17 | 0 |

With respect to FIG. 1, wireless device 110a is an example of a CE level 0 wireless device. Wireless device 110a is in normal coverage and may receive all three SI messages (i.e., SI-1, SI-2, and SI-3). Wireless device 110b is an example of a CE level 1 wireless device. Wireless device 110b benefits from some amount of coverage enhancement and may only receive two SI messages (i.e., SI-1 and SI-2). Wireless device 110b may operate without the non-essential information included in SIB16 and SIB17. Thus, wireless device 110b does not expend the additional resources to acquire SI-3. Wireless device 110c is an example of a CE level 2 wireless device. Wireless device 110c relies on a greater level of coverage enhancement than wireless devices 110a and 110b. Wireless device 110c may only receive the most essential SI message (i.e., SI-1 in this example).

In particular embodiments, the CE level may correspond to a number of repetitions, a coding scheme, a coding rate, a periodicity of transmissions, or some other transmission parameter indicative of the intended coverage of the SI message in question. SIBs included in the table given above may include a combination of legacy (or subset of legacy) SIBs, or new SIBs to be received by a low complexity UE operating at the specified CE level. In particular embodiments, a new SIB may contain the same information as a corresponding legacy SIB, or subsets or combinations of information from legacy SIBs.

In particular embodiments, the SI messages in the table above (e.g., SI-1, etc.) may refer to messages that are specific to low complexity UEs, or to messages that also apply to legacy UEs. For example, in some embodiments, a SI message that is shared between both types of UEs is transmitted, and is intended to be received, using the same physical layer parameters (e.g., time/frequency allocation, repetition level, modulation and coding scheme, etc.) for legacy UEs as well as low complexity UEs with particular CE level(s). This may be feasible for UEs in operating conditions corresponding to one of the lowest CE levels.

Even if the physical layer parameters coincide, however, the method of indicating these parameters may differ between the different types of UEs. For example, PDCCH may be used for legacy UEs and CE-SIB1 may be used for low complexity UEs. In some embodiments, a system information message that is shared between both types of UEs may include additional repetitions scheduled in order to improve reception performance for UEs operating in enhanced coverage. In other embodiments, the system information messages may be the same, but they are scheduled using different physical layer parameters for the different types of UEs.

At step 214, the wireless device determines a coverage enhancement level associated with each of the plurality of SIB-to-SI message mappings. In particular embodiments, the low complexity UE reads CE-SIB1 and the scheduling information for each SI message. For example, wireless device 110a may read the CE-SIB1 to determine that SI-1 is associated with CE level 2, SI-2 is associated with CE level 1, and SI-3 is associated with CE level 0.

In particular embodiments, the low complexity UE may determine the associated coverage enhancement level based on a resource allocation (e.g., time, frequency, transmission pattern, etc.) which may be included in the scheduling information. Based on the resource allocation, the UE may determine the number of repetitions and verifies that it is sufficient to acquire the particular SI message. In such an embodiment, the resource allocation may serve as an implicit coverage level indication.

In some embodiments, a CE level indicated in CE-SIB1 may refer to a physical downlink control channel (e.g., EPDCCH) for a transport block containing an SI message rather than the transport block itself. In other embodiments, a CE level indicated in CE-SIB1 may refer to both a physical downlink control channel and an associated transport block.

At step 216, the wireless device determines a coverage enhancement level of the wireless device. For example, wireless device 110a may determine that its own coverage enhancement level is coverage enhancement level 0. Wireless devices 110b and 100c may determine that their coverage enhancement levels are coverage enhancement levels 1 and 2, respectively.

In particular embodiments, a low complexity UE, such as wireless device 110, may be aware of its coverage enhancement level. The UE may obtain such information by, for example, measuring a signal strength/quality of the serving cell and mapping the measurement value to a coverage enhancement level in a pre-defined set (e.g., 0, 5, 10, 15 dB coverage enhancement).

Because the signal-to-noise ratio (SNR) may be low at the operating points where a UE requires coverage enhancement, the legacy measurement procedures of determining signal strength or quality based on cell-specific reference signals (CRS), such as reference signal received power (RSRP) and reference signal received quality (RSRQ), may produce inaccurate results. In these scenarios, alternative measures of the coverage enhancement level may be used. In one example, the UE may determine the amount of accumulated information required by the UE to detect the cell. The UE may use legacy primary or secondary synchronization signals (PSS/SSS), or some other synchronization signal, to determine the amount of accumulated information required to detect the cell. As another example, the UE may determine the number of repetitions required by the UE to detect some other broadcast information, for example the (possibly repeated) legacy PBCH carrying the Master Information Block.

In particular embodiments, a network node may communicate a coverage enhancement level to the low complexity UE. For example, network node 120 may signal a coverage enhancement level to wireless device 110 using any suitable signaling method. Particular embodiments may combine one or more of the techniques described herein for determining a coverage enhancement level of the wireless device. For example, a wireless device may measure a signal strength/quality and determine the amount of accumulated information required to detect a cell when determining its coverage enhancement level.

At step 218, the wireless device identifies a SIB-to-SI message mapping of the plurality of SIB-to-SI message mappings using the coverage enhancement level of the wireless device. In particular embodiments, if the coverage enhancement level indicated in the scheduling information determined at step 214 matches the coverage enhancement level of the UE determined at step 216, then the UE may attempt to acquire the corresponding SI message.

For example, wireless device 110*a* received SI message scheduling information received at step 214 and determined its coverage enhancement level of 0 at step 216. Comparing its coverage enhancement level with the scheduling information, wireless device 110*a* determines that it should attempt to acquire any SI message associated with coverage enhancement level equal to or greater than zero (e.g., SI-1, SI-2, and SI-3). As another example, wireless device 110*c*, based on its coverage enhancement level of 2, determines that it should attempt to acquire any SI message associated with coverage enhancement level equal to or greater than 2 (e.g., SI-1).

At step 220, the wireless device acquires an SI message using the identified SIB-to-SI message mapping. For example, wireless device 110*a* may acquire SI-1, SI-2, and SI-3; wireless device 110*b* may acquire SI-1 and SI-2; and wireless device 110*c* may acquire SI-1.

A particular advantage of the associated coverage enhancement level is that a low complexity UE may determine whether it should, or is able, to acquire a specific SI message. For example, wireless device 110*c* will not likely be able to acquire SI-2 or SI-3 because of the poor radio coverage of wireless device 110*c*. For wireless device 110*c* to be able to acquire SI-2 or SI-3, network node 120 would likely have to increase the retransmissions of SI-2 and SI-3. Thus, in particular embodiments wireless device 110*c* will attempt to acquire SI-1, but will not waste time or power attempting to acquire SI-2 and SI-3 and network node 120 will not waste resources retransmitting SI-2 and SI-3 more than necessary.

Accordingly, low complexity UEs requiring high amounts of coverage enhancement may avoid reading non-essential system information or system information that cannot be decoded (due to the number of repetitions being too few), thereby conserving both time and power. In addition, system resources may be preserved because SI messages intended for low complexity UEs in normal coverage may be sent with fewer repetitions.

At optional step 222, the wireless device determines whether acquiring a SI message from the identified subset of the one or more SI messages is successful. In particular embodiments, a UE operating at a particular CE level may be expected to behave in certain ways with regard to, for example, measurement behavior, event reporting, mobility behavior, cell (re)selection, etc. Some of this behavior may depend on information broadcasted in the SIBs. If a UE fails to successfully receive the system information intended for a particular CE level, the UE may fall back to a higher CE level, and thus retrieve the system information associated with the higher CE level instead. For example, if wireless device 110*b* is unable to successfully acquire SI-1 and SI-2 at coverage enhancement level 1, wireless device 110*b* may modify its coverage enhancement level. Wireless device 110*b* may modify its coverage enhancement level to level 3 and return to method step 216.

In particular embodiments, failure to acquire system information at a particular coverage enhancement level may be determined by a counter of failed decoding attempts that exceeds a threshold value or a timer that expires. The thresholds and timer values may be specified by a standards document, may be part of broadcasted information that may be received robustly, may be specific to a UE implementation, or may be any suitable combination of these.

In particular embodiments, the ability of a UE to successfully receive the SIBs according to a specific CE level may further decide how the UE connects to the network in terms of different random access strategies, such as what random access resources to use and the required number repetitions of a random access preamble, etc.

Modifications, additions, or omissions may be made to method 200 of FIG. 2. Additionally, one or more steps in the method of FIG. 2 may be performed in parallel or in any suitable order. The method may be repeated as necessary over time.

Figure 3:
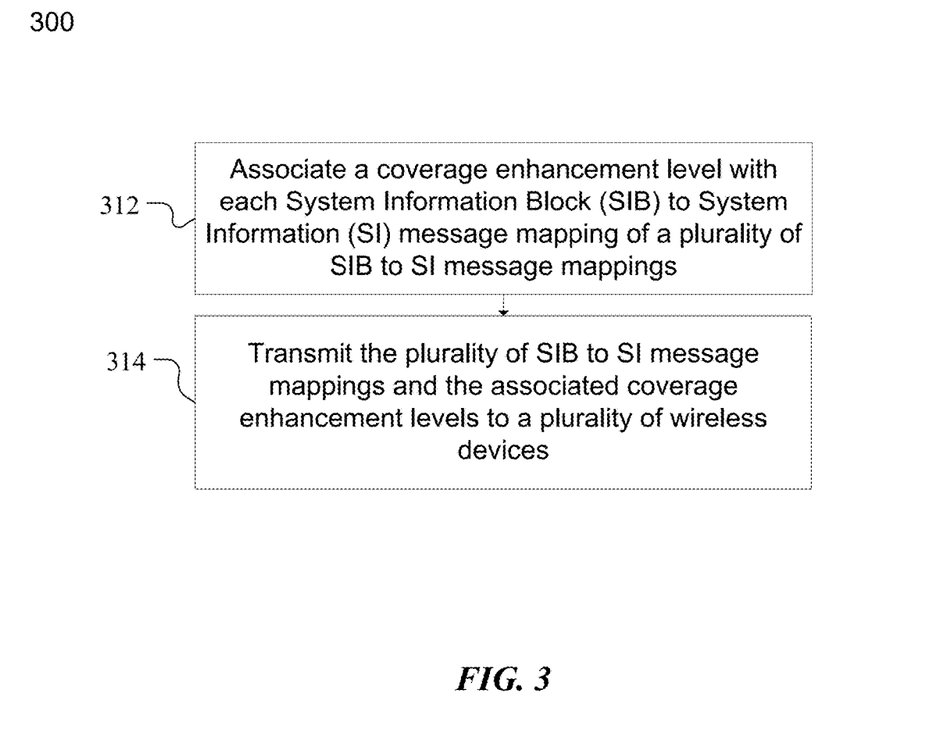
FIG. 3 is a flowchart of an example method in a network node of selectively distributing system information, according to a particular embodiment.

FIG. 3 is a flowchart of an example method 300 in a network node of selectively distributing system information, according to a particular embodiment. In particular embodiments, one or more steps of the method may be performed by components of network 100 described with reference to FIGS. 1-5B.

The method begins at step 312, where a network node associates a coverage enhancement level with each of one or more SI messages. For example, network node 120 may determine that SI-1 is associated with CE level 2; SI-1 and SI-2 are associated with CE level 1; and SI-1, SI-2, and SI-3 are associated with CE level 0. In particular embodiments, network node 120 may include the CE level association in the scheduling information associated with each SI message.

At step 314, the network node transmits scheduling information that includes the associated coverage enhancement level for each of the one or more SI messages to a plurality of wireless devices. For example, network node 120 may transmit the scheduling information with CE levels to wireless devices 110*a*, 110*b*, and 100*c*. As described with respect to method 200, wireless devices 110 may determine which SI messages to acquire by matching its own CE level with the associated SI messages in the scheduling information.

A particular advantage of the associated coverage enhancement level is that the network node is not required to transmit all SI messages with the maximum number of repetitions so that even a wireless device under the worst radio conditions can acquire all the SI messages. For example, network node 120 may need to transmit SI-2 and SI-3 with a high number of retransmissions if wireless device 110*c* is to be able to acquire SI-2 or SI-3 because of the poor radio coverage of wireless device 110*c*. If SI-2 and SI-3 include non-essential information, however, then network node 120 may conserve resources by transmitting SI-2 and SI-3 with just enough repetitions for wireless devices under coverage enhancement level 0 (e.g., wireless device 110*a*) to acquire SI-2 and SI-3. Thus, in particular embodiments network node 120 will not waste resources retransmitting SI-2 and SI-3 more than necessary. Accordingly, system resources may be preserved because SI messages intended for low complexity UEs in normal coverage may be sent with fewer repetitions.

Modifications, additions, or omissions may be made to method 300 of FIG. 3. Additionally, one or more steps in the method of FIG. 3 may be performed in parallel or in any suitable order. The method may be repeated as necessary over time.

The embodiments described herein refer to wireless devices in need of coverage enhancement, such as a low complexity UE. The embodiments, however, may apply to other types of UEs in need of coverage enhancement. For example, the interpretation of information associated with a particular CE level may be different for a low complexity UE and a normal complexity UE, and the behavior of the UEs may differ accordingly.

Figure 4A:
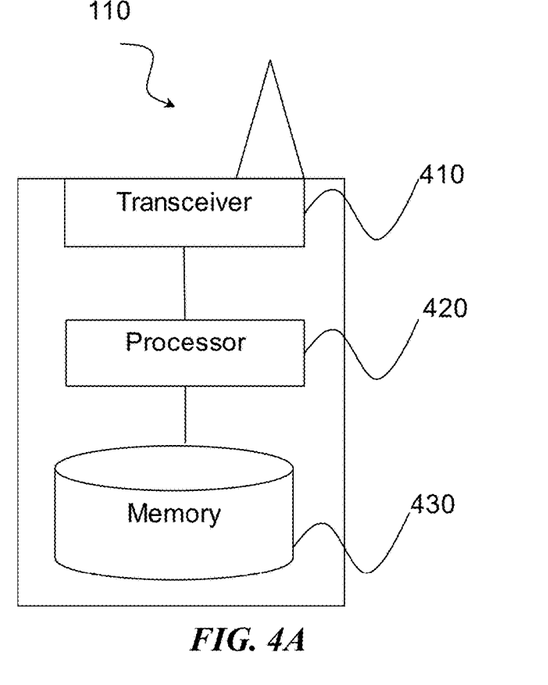
FIG. 4A is a block diagram illustrating an example embodiment of a wireless device.

FIG. 4A is a block diagram illustrating an example embodiment of a wireless device. The wireless device is an example of wireless devices 110 illustrated in FIG. 1.

Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 410, processor 420, and memory 430. In some embodiments, transceiver 410 facilitates transmitting wireless signals to and receiving wireless signals from network node 120 (e.g., via an antenna), processor 420 executes instructions to provide some or all of the functionality described herein as provided by the wireless device, and memory 430 stores the instructions executed by processor 420.

Processor 420 includes any suitable combination of hardware and software implemented in one or more integrated circuits or modules to execute instructions and manipulate data to perform some or all of the described functions of the wireless device. Memory 430 is generally operable to store computer executable code and data. Examples of memory 430 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 420 in communication with transceiver 410 receives, from network node 120, SI message scheduling information including associated coverage enhancement levels; determines a coverage enhancement level of wireless device 110; and acquires system information blocks corresponding to the determined coverage enhancement level. For example, processor 420 in communication with transceiver 410 may perform the steps of method 200 illustrated in FIG. 2. Other embodiments of the wireless device may include additional components (beyond those shown in FIG. 4A) responsible for providing certain aspects of the wireless device's functionality, including any of the functionality described above and/or any additional functionality (including any functionality necessary to support the solution described above).

Figure 4B:
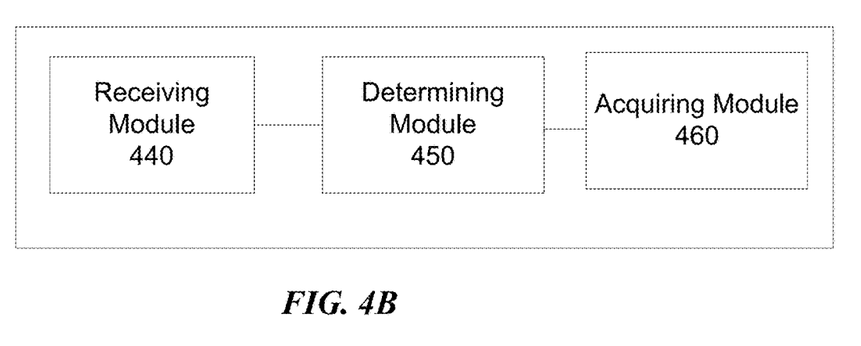
FIG. 4B is a block diagram illustrating example components of a wireless device.

FIG. 4B is a block diagram illustrating example components of a wireless device. The components may include receiving module 440, determining module 450, and acquiring module 460.

Receiving module 440 may perform the receiving functions of wireless device 110. For example, receiving module 440 may receive SI messages and scheduling information from network node 120. In certain embodiments, receiving module 440 may include or be included in processor 420. Receiving module 440 may include circuitry configured to receive radio signals. In particular embodiments, receiving module 440 may communicate information to determining module 450 or acquiring module 460.

Determining module 450 may perform the functions of wireless device 110 for determining a coverage enhancement level of wireless device 110 and determining which SI messages to acquire. In certain embodiments, determining module 450 may include or be included in processor 420. Determining module 450 may include circuitry configured to receive and evaluate radio signals. In particular embodiments, determining module 450 may communicate information to acquiring module 460.

Acquiring module 460 may perform the acquiring functions of wireless device 110. For example, acquiring module 460 may acquire SI messages from network node 120. In certain embodiments, acquiring module 460 may include or be included in processor 420. Acquiring module 460 may include circuitry configured to receive and evaluate radio signals. In particular embodiments, acquiring module 460 may communicate information to determining module 450.

Figure 5A:
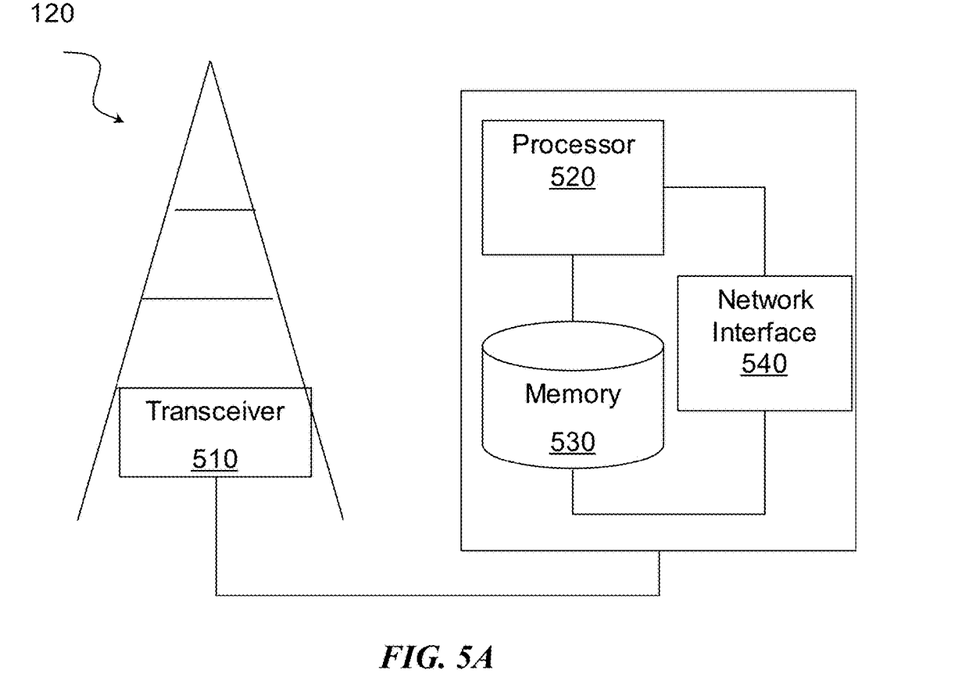
FIG. 5A is a block diagram illustrating an example embodiment of a network node.

FIG. 5A is a block diagram illustrating an example embodiment of a network node. Network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 510, at least one processor 520, at least one memory 530, and at least one network interface 540. Transceiver 510 facilitates transmitting wireless signals to and receiving wireless signals from a wireless device, such as wireless devices 110 (e.g., via an antenna); processor 520 executes instructions to provide some or all of the functionality described above as being provided by network node 120; memory 530 stores the instructions executed by processor 520; and network interface 540 communicates signals to backend network components, such as a gateway, switch, router, Internet, Public Switched Telephone Network (PSTN), controller, and/or other network nodes 120. Processor 520 and memory 530 can be of the same types as described with respect to processor 420 and memory 430 of FIG. 4A above.

In some embodiments, network interface 540 is communicatively coupled to processor 520 and refers to any suitable device operable to receive input for network node 120, send output from network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

In particular embodiments, processor 520 in communication with transceiver 510 associates coverage enhancement levels with SI messages; transmits, to wireless device 110, SI message scheduling information and associated coverage enhancement levels; and transmits, to wireless device 110, a plurality of system information blocks. For example, processor 520 in communication with transceiver 510 may perform the steps of method 300 illustrated in FIG. 3.

Other embodiments of network node 120 include additional components (beyond those shown in FIG. 5A) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 5B:
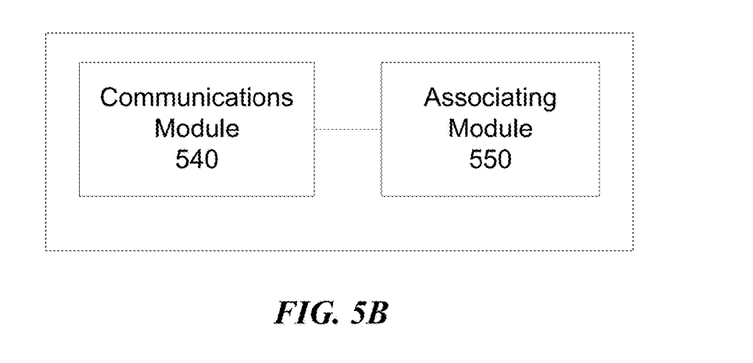
FIG. 5B is a block diagram illustrating example components of a network node.

FIG. 5B is a block diagram illustrating example components of a network node. The components may include communications module 540 and associating module 550.

Communications module 540 may perform the communication functions of network node 120. For example, communications module 540 may transmit SI messages and scheduling information to wireless devices 110. In certain embodiments, communications module 540 may include or be included in processor 520. Communications module 540 may include circuitry configured to transmit radio signals.

Associating module 550 may perform the associating functions of network node 120. For example, associating module 550 may associate coverage enhancement levels with SI messages. In certain embodiments, associating module 550 may include or be included in processor 520. In particular embodiments, associating module 550 may communicate information to communications module 540.

Some embodiments of the disclosure may provide one or more technical advantages. Particular embodiments associate a coverage enhancement level with each SI message in a CE-SIB 1 scheduling information to facilitate a low complexity UE determining whether to acquire a particular SI message. The associated coverage enhancement level facilitates distributing different sets of system information to low complexity UEs with differing levels of coverage enhancement (e.g., in different coverage situations). For example, low complexity UEs requiring high amounts of coverage enhancement may avoid reading non-essential system information or system information that cannot be decoded (due to the number of repetitions being too few), thereby conserving both time and power. In addition, system resources may be preserved because SI messages intended for low complexity UEs in normal coverage may be sent with fewer repetitions.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
CDMA2000 Code division multiple access 2000
CE Coverage enhanced or coverage enhancement
CRS Cell-Specific Reference Signal
DCI Downlink Control Information
DRS Discovery Reference Signal
eNB Enhanced Node-B
eNodeB Enhanced Node-B
EPC Evolved Packet Core
EPDCCH Enhanced Physical Downlink Control Channel
GSM Global System for Mobile communication
LAN Local Area Network
LTE Long Term Evolution
MAN Metropolitan Area Network
MIB Master Information Block
MIMO Multi-Input Multi-Output
MTC Machine Type Communication
OFDM Orthogonal Frequency-Division Multiplexing
PBCH Physical Broadcast Channel
PDCCH Physical Downlink Control Channel
PSTN Public Switched Telephone Network
PRB Physical Resource Block
PSS Primary Synchronization Signal
RAT Radio Access Technology
RE Resource Element
RB Resource Block
RRM Radio Resource Management
RSRP Reference Signal Received Power
RSRQ Reference Signal Received Quality
SI System Information
SIB System Information Block
SNR Signal to Noise Ratio
SSC Secondary Serving Cell
SSS Secondary Synchronization Signal
UE User Equipment
UMTS Universal Mobile Telecommunications System
WAN Wide Area Network
WiMAX Worldwide Interoperability for Microwave Access

The invention claimed is:

1. A method in a wireless device of a wireless communication network, the method comprising:
   receiving scheduling information and associated System Information Block (SIB)-to-System Information (SI) message mappings for one or more SI messages;
   determining a coverage enhancement level associated with each of the one or more SIB-to-SI message mappings based on the received scheduling information;
   determining a coverage enhancement level of the wireless device;
   identifying a SIB-to-SI message mapping of the one or more SIB-to-SI message mappings using the determined coverage enhancement level of the wireless device; and
   acquiring one or more SI messages using the identified SIB-to-SI message mapping, wherein the one or more SI messages have an associated coverage enhancement level that is greater than or equal to the determined coverage enhancement level of the wireless device.

2. The method of claim 1, wherein determining a coverage enhancement level associated with each of the one or more SIB-to-SI message mappings comprises determining the coverage enhancement level using an explicit indication included in the scheduling information.

3. The method of claim 1, wherein determining a coverage enhancement level associated with each of the one or more SIB-to-SI message mappings comprises determining that a resource allocation included in the scheduling information is sufficient to acquire an SI message based on the coverage enhancement level of the wireless device.

4. The method of claim 3, wherein the resource allocation included in the scheduling information comprises a number of transmission repetitions associated with the respective SI message.

5. The method of claim 1, wherein determining a coverage enhancement level associated with each of the one or more SIB-to-SI message mappings comprises determining the coverage level of at least one of a physical downlink control channel and a transmission block.

6. The method of claim 1, further comprising:
   determining that acquiring one of the one or more SI messages is unsuccessful;

increasing the determined coverage enhancement level of the wireless device;

identifying a new SIB-to-SI message mapping of the one or more of SIB-to-SI message mappings based on the increased coverage enhancement level of the wireless device; and acquiring a SI message using the new SIB-to-SI message mapping.

7. The method of claim 1, wherein determining a coverage enhancement level of the wireless device comprises at least one of:

measuring an amount of accumulated information the wireless device needs to detect a synchronization or broadcast signal; and obtaining a signal strength or quality metric based on measurements on one or more reference signals.

8. A method in a network node of a wireless communication network, the method comprising:

associating a coverage enhancement level with each System Information Block (SIB)-to-System Information (SI) message mapping for one or more SI messages, wherein the coverage enhancement level corresponds to a transmission parameter indicative of an intended amount of coverage enhancement of the associated SI message;

transmitting scheduling information and the associated SIB-to-SI message mappings, wherein the scheduling information includes the associated coverage enhancement level for each of the one or more SIB-to-SI message mappings to a plurality of wireless devices; and transmitting one or more SI messages to one or more of the plurality of wireless devices, wherein the one or more SI messages comprises SI messages having an associated coverage enhancement level that is greater than or equal to a coverage enhancement level of the one or more wireless devices.

9. The method of claim 8, wherein the coverage enhancement level associated with each of the one or more SIB-to-SI message mappings comprises an explicit indication included in the scheduling information.

10. The method of claim 8, wherein the coverage enhancement level associated with each of the one or more SIB-to-SI message mappings comprises a resource allocation included in the scheduling information, the resource allocation providing sufficient resources to acquire a SI message based on a coverage enhancement level of a wireless device.

11. The method of claim 10, wherein the resource allocation included in the scheduling information comprises a number of transmission repetitions associated with a respective SI message.

12. The method of claim 9, wherein the coverage enhancement level associated with each of the one or more SI messages comprises a coverage enhancement level for at least one of a physical downlink control channel and a transmission block.

13. A wireless device comprising a processor operable to:

receive scheduling information and associated System Information Block (SIB)-to-System Information (SI) message mappings for one or more SI messages;

determine a coverage enhancement level associated with each of the one or more SIB-to-SI message mappings based on the received scheduling information;

determine a coverage enhancement level of the wireless device;

identify a SIB-to-SI message mapping of the one or more SIB-to-SI message mappings using the determined coverage enhancement level of the wireless device; and acquire one or more SI messages using the identified SIB-to-SI message mapping, wherein the one or more SI messages have an associated coverage enhancement level that is greater than or equal to the determined coverage enhancement level of the wireless device.

14. The wireless device of claim 13, wherein the processor is further operable to determine the coverage enhancement level associated with each of the one or more SIB-to-SI message mappings using an explicit indication included in the scheduling information.

15. The wireless device of claim 13, wherein the processor is further operable to determine that a resource allocation included in the scheduling information is sufficient to acquire an SI message based on the coverage enhancement level of the wireless device.

16. The wireless device of claim 15, wherein the resource allocation included in the scheduling information comprises a number of transmission repetitions associated with the respective SI message.

17. The wireless device of claim 13, wherein the processor is further operable to determine the coverage level of at least one of a physical downlink control channel and a transmission block.

18. The wireless device of claim 13, the processor further operable to:

determine that the acquisition of one of the one or more SI messages is unsuccessful;

increase the determined coverage enhancement level of the wireless device;

identify a new SIB-to-SI message mapping of the one or more of SIB-to-SI message mappings based on the determined increased coverage enhancement level of the wireless device; and acquire a SI message using the new SIB-to-SI message mapping.

19. The wireless device of claim 13, wherein the processor is further operable to:

measure an amount of accumulated information the wireless device needs to detect a synchronization or broadcast signal; or obtain a signal strength or quality metric based on measurements on one or more reference signals.

20. A network node comprising a processor operable to:

associate a coverage enhancement level with each System Information Block (SIB)-to-System Information (SI) message mapping for one or more SI messages, wherein the coverage enhancement level corresponds to a transmission parameter indicative of an intended amount of coverage enhancement of the associated SI message;

transmit scheduling information and the associated SIB-to-SI message mappings, wherein the scheduling information includes the associated coverage enhancement level for each of the one or more SIB-to-SI message mappings to a plurality of wireless devices; and transmit one or more SI messages to one or more of the plurality of wireless devices, wherein the one or more SI messages comprises SI messages having an associated coverage enhancement level that is greater than or equal to a coverage enhancement level of the one or more wireless devices.

21. The network node of claim 20, wherein the coverage enhancement level associated with each of the one or more SIB-to-SI message mappings comprises an explicit indication included in the scheduling information.

22. The network node of claim 20, wherein the coverage enhancement level associated with each of the one or more SIB-to-SI message mappings comprises a resource allocation included in the scheduling information, the resource allocation providing sufficient resources to acquire a SI message based on a coverage enhancement level of a wireless device.

23. The network node of claim 22, wherein the resource allocation included in the scheduling information comprises a number of transmission repetitions associated with a respective SI message.

24. The network node of claim 20, wherein the coverage enhancement level associated with each of the one or more SI messages comprises a coverage enhancement level for at least one of a physical downlink control channel and a transmission block.

* * * * *